United States Patent [19]

Stille

[11] 4,000,187
[45] Dec. 28, 1976

[54] QUINOLINE AND ANTHRAZOLINE POLYMERS

[75] Inventor: John K. Stille, Iowa City, Iowa

[73] Assignee: University of Iowa Research Foundation, Iowa City, Iowa

[22] Filed: Apr. 11, 1972

[21] Appl. No.: 243,525

[52] U.S. Cl. .............................. 260/50; 260/306 R; 260/308 DS; 260/312 N; 260/33.4 P; 260/33.8 R; 260/49; 260/51 R; 260/51.5; 260/64; 260/65; 428/524

[51] Int. Cl.² ........................................ C08G 73/06

[58] Field of Search .............. 260/64, 65, 50, 51.5, 260/49, 51; 117/161 UN; 428/524

[56] References Cited

UNITED STATES PATENTS

| | | | |
|---|---|---|---|
| 3,493,541 | 2/1970 | Gall | 260/72.5 |
| 3,506,613 | 4/1970 | Bayer | 260/65 |
| 3,509,097 | 4/1970 | Hoyt et al. | 260/65 |
| 3,661,850 | 5/1972 | Stille | 260/50 |

OTHER PUBLICATIONS

Bracke, Polymers with Anthrazoline Units in the Main Chain, Macromolecules, vol. 2, No. 3, May–June, 1969.

Primary Examiner—Lester L. Lee
Attorney, Agent, or Firm—Beveridge, DeGrandi, Kline

[57] ABSTRACT

Polymers containing recurring quinoline or anthrazoline groups which are reaction products of aromatic amino carbonyl compounds containing two sets of ortho-amino aldehyde or ortho-amino ketone functions attached to the aromatic nucleus having the general structure:

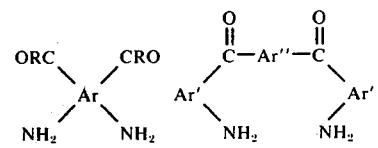

(wherein R is hydrogen, or aryl and the Ar's are aryl groups) with methylene ketones containing two ketone functions having a methylene group adjacent to each ketone and having the general structure:

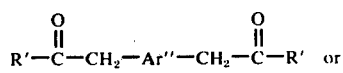

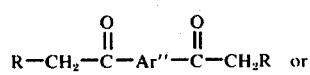

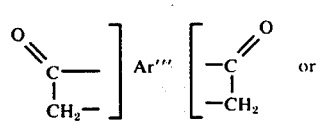

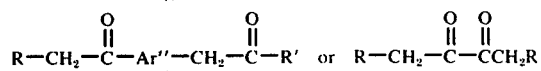

(wherein R = hydrogen or aryl and R' = aryl and the Ar's are aryl groups) are described. According to the above, R from both the aromatic amino carbonyl and the aromatic methylene ketone could be hydrogen when producing a polymer, but the polymer in which both R's are hydrogen is excluded from this invention.

77 Claims, No Drawings

QUINOLINE AND ANTHRAZOLINE POLYMERS

The invention herein described was made in the course of or under a contract with the Department of the Air Force.

The present invention relates to polymeric compounds containing the characteristic quinoline- or anthrazoline-type structure, and more particularly, to polymeric compounds formed by the reaction of a bisaromatic ortho-amino carbonyl compound and a bis methylene ketone. The present invention further relates to methods of making the aforementioned polymeric compounds.

Suitable for use as thermally stable laminating resins, adhesive compositions, coating materials, films and fibers in general, the quinoline or anthrazoline polymers of the present invention have a wide applicability. Because of their desirable properties, the polymers are valuable for high temperature metal adhesives, particularly for aluminum, steel, and titanium alloys. In addition, the polymers of the present invention are capable of functioning as high temperature electrical insulators, foams, ablative materials and rocket nozzles.

Accordingly it is the object of the present invention to provide methods of making polymer and polymers which have desirable properties making them useful for a wide variety of purposes.

It is a further object of the present invention to provide resinous adhesives, coatings, laminates, films and fibers that possess desirable heat stability.

It is a further object of the present invention to provide resinous compositions that have particular application where high temperature strength and thermal stability are required.

It is a further object of the present invention to provide a method for producing polymers that are capable of withstanding high temperatures and are characterized by high thermal stability. It is a further object of this invention to provide thermally stable polymers which have initial solubility in certain solvents suitable for laminating, casting films, wet or dry-spinning fibers, coating, and laying down adhesives.

In attaining the above objectives, one feature of the present invention resides in reacting an aromatic amino carbonyl compound containing two sets of ortho-amino aldehyde or ortho-amino ketone functions attached to an aromatic nucleus, with a monomer containing two ketone functions having a methylene group adjacent to each ketone function. The aromatic amino aldehyde or amino ketone can be used in the form of a salt.

Another feature of the invention resides in being able to cure the polymers or crosslink them at high temperatures in the solid state and thereby rendering them insoluble.

Other objects, features and advantages of the present invention, in addition to the above, will become apparent from the following detailed description thereof.

According to the present invention, polymers can be prepared by reacting an aromatic amino carbonyl compound containing two sets of ortho-amino aldehyde or ortho-amino ketone functions attached to the aromatic nucleus and represented by the general formulas:

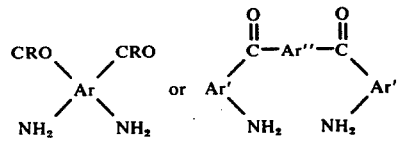

(wherein $R$ is hydrogen, or aryl, Ar is any aryl in which the positions of attachment of each set of carbonyl and amino function are ortho, $AR'$ is any aryl in which the positions of attachment of the carbonyl and amino function are ortho and $Ar''$ is any connecting aryl group) with a methylene ketone containing two ketone functions having a methylene group adjacent to each ketone function and having the general formulas:

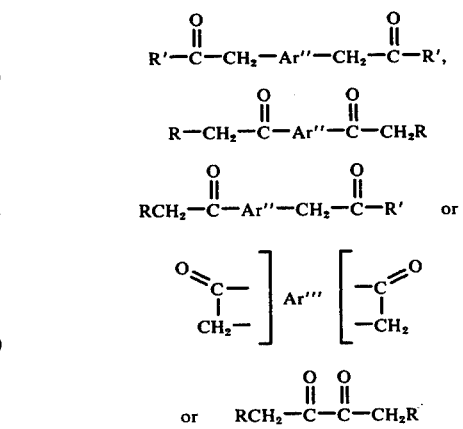

(wherein $R$ = hydrogen or aryl, $R'$ = aryl, $Ar''$ is any connecting group, and $Ar'''$ is an aryl group, four positions of which are occupied by connection of the methylene carbonyl functions).

Included among the aromatic amino carbonyl compounds containing two sets of ortho-amino aldehyde or ortho-amine ketone functions attached to an aromatic nucleus are compounds of the formulas:

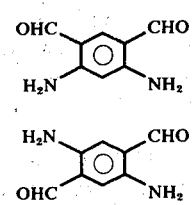
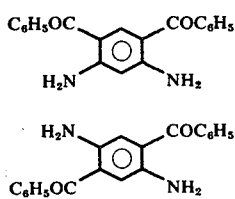

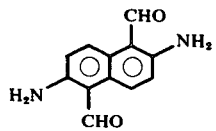
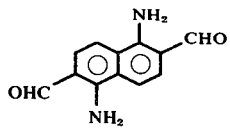
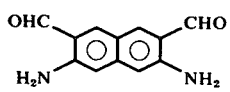
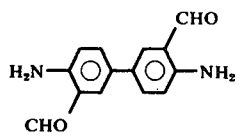
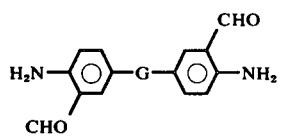
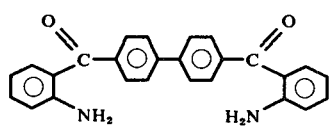

-continued

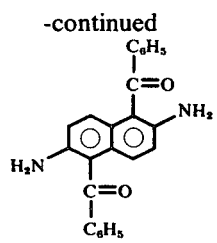
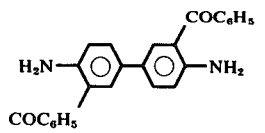
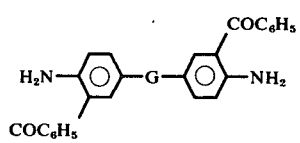
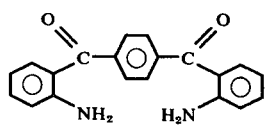
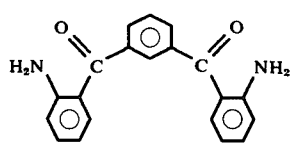
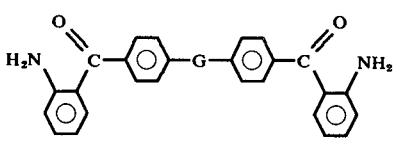

The symbol G represents a divalent group selected from the group consisting of alkylene, arylene, aralkylene, alkarylene, oxygen, sulfur, sulfoxide, sulfone, dialkylsilicon and diarylsilicon. Suitable derivatives of the above amino carbonyl compounds can also be employed for purposes of the present invention. Representative of these derivatives are the salts of acids, e.g. dihydrochlorides. It is to be understood that each of the above amino carbonyls, or an amino carbonyl of the general formula, may be substituted in place of the specific amino carbonyl shown in the examples infra with satisfactory results.

It will be apparent from the foregoing illustrative members that Ar can be any aromatic nucleus including a single aromatic ring and a polycylic aromatic nucleus. The substituent Ar may also be represented by the following:

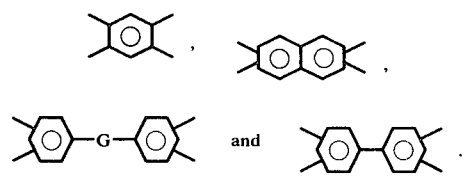

When the R substituent is aryl, it is most commonly $C_6H_5$.

The substituent Ar' is illustrated by the group

and the substituent Ar" is illustrated by the following groups:

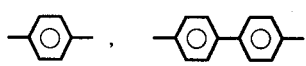

and

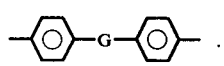

Within the above definition of the substituent G, the most common members are alkylene from 1 to 12 carbon atoms, arylene group containing from 6 to 12 carbons, aralkylene containing from 7 to 10 carbons, arkarylene containing from 7 to 10 carbons O, S, SO, $SO_2$, dialkylsilicon containing 1 to 5 carbons per alkyl group and diarylsilicon containing 6 carbons per aryl group.

Included among the methylene ketones containing two ketone functions having a methylene group adjacent to each ketone are compounds of the formulas:

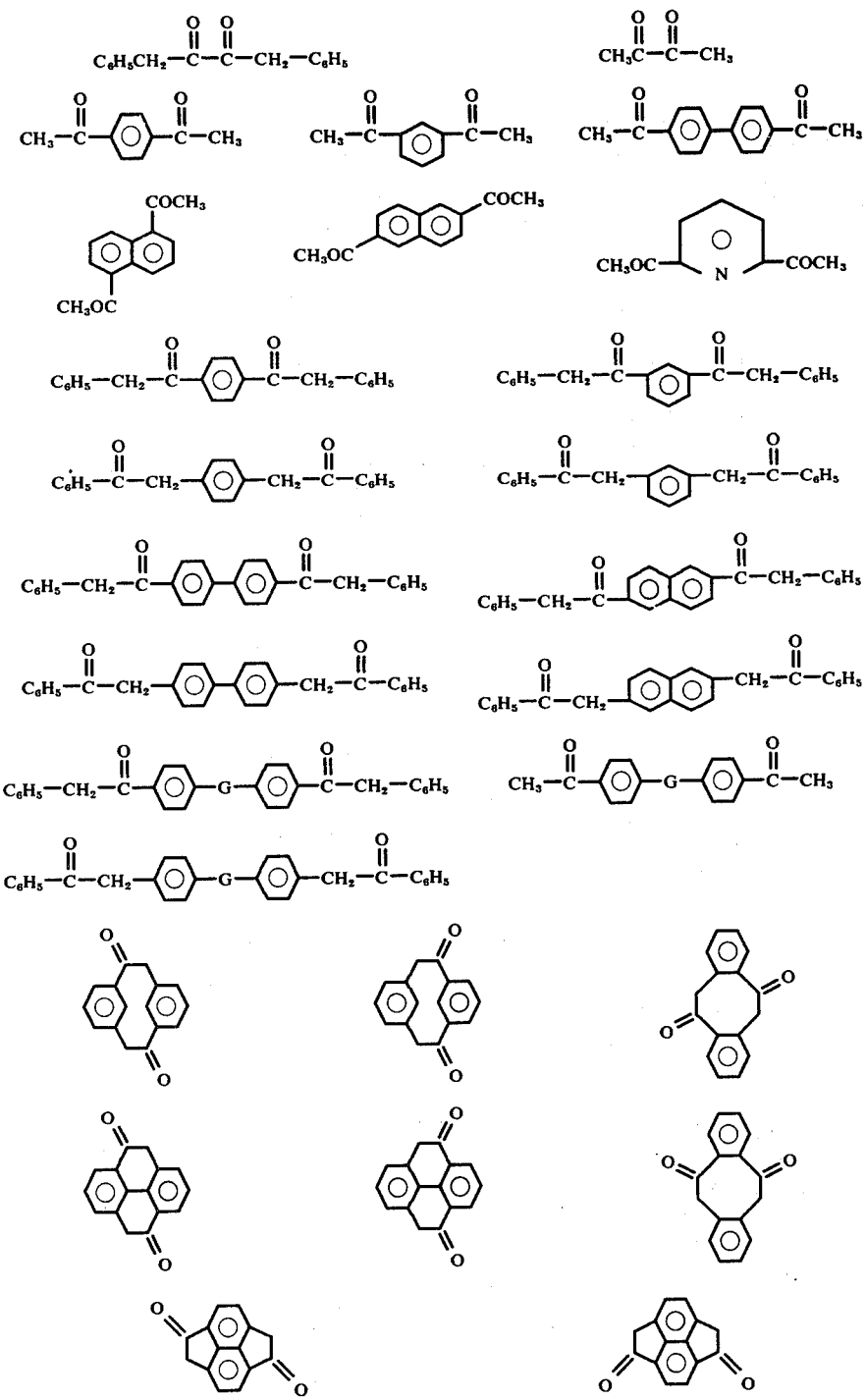

It will be apparent from the foregoing description of the methylene ketones that the symbol Ar" may be a single or polycyclic aromatic nucleus, illustratively,

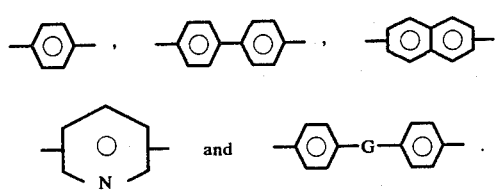

When the substituent R' or R is aryl, it is most often $C_6H_5$.

It will further be apparent from the above that the symbol Ar''' is a tetrafunctional aromatic nucleus and may be two bifunctional aromatic nuclei not already joined together or a single tetrafunctional nucleus, e.g., a fused ring structure or bicyclic structure already joined some way; viz:

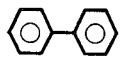

The symbol G represents a divalent group selected from the group consisting of alkylene, arylene, aralkylene, alkarylene, oxygen, sulfur, sulfoxide, sulfone, dialkyl silicon and diaryl silicon. It is to be understood that each of the above methylene diketones, or ketones of the general formula, may be substituted in place of the specific ketone shown in the examples infra with satisfactory results.

In a more particular aspect of the invention, the symbol G is defined as stated in connection with the identification of the amino carbonyl compounds above.

According to this invention, the amino carbonyl compound and methylene ketone reactants are selected such that neither, or at least only one of them, contain R substituents equal to hydrogen; i.e., at least one substituent R group is aryl. Stated another way, not all R groups in a given reaction system are hydrogen.

The polymers of the present invention are produced by reacting an aromatic amino carbonyl compound of the above structure with a methylene ketone as defined above by allowing equimolar amounts or nearly equimolar amounts of the two to react in the presence of either an acid or a base catalyst in a suitable solvent. An inert atmosphere for the reaction is preferable, although not necessary. The reaction takes place at room temperature or below, but convenient reaction temperatures are from about 25° C to 250° C., and usually about 25° C. to 200° C. To expedite the reaction, the temperature is raised gradually throughout the course of the reaction until temperatures of about 180° C are reached. The acid catalysts can be either protonic or Lewis acids. Hydrogen halides (fluoride, chloride, bromide or iodide), sulfuric acid, a sulfonic acid, e.g. as toluenesulfonic acid, phosphoric acid, polyphosphoric acid, trifluoroacetic acid etc. are examples of protonic acid catalysts, while boron fluoride, phosphorous pentafluoride, aluminum chloride, antimony trifluoride, antimony pentafluoride, antimony trichloride, stannic chloride etc. are examples of Lewis acid catalysts. The base catalysts can be either hydroxylic or Lewis bases. Sodium hydroxide, potassium hydroxide, calcium hydroxide, lithium hydroxide etc. are examples of hydroxylic base catalysts while N-ethyl morpholine, triethyl amine, 1,5-diazabicyclo[4.3.0]non-5-ene, 1,4-diazabicyclo[2,2,2] octane etc. are examples of Lewis base catalysts.

A wide variety of solvents are available for either the acid or the base catalyzed reaction. The solvent employed for these reactions should not react under the reaction conditions with either the acid or the base catalyst or with any of the functional groups on the monomers, such that this reaction would have an adverse effect on the polymerization reaction. Benzene, chlorobenzene, 1-chloronaphthalene, tetralin, acetic acid, formic acid, phenols, e.g. m-cresol, o-, m- and p-dichlorobenzene (or mixtures thereof), polyphosphoric acid etc. are solvents which can be used in the acid catalyzed reactions. In certain cases, such as that of polyphosphoric acid, the solvent also may serve as the acid catalyst. In other cases, such as those of formic and acetic acids, it is desirable to add a strong acid catalysts since formic and acetic acids are not strong enough at the reaction temperatures to provide sufficient catalysis and reaction speed in order that the high molecular weight polymer will be produced within convenient reaction times. Dimethylsulfoxide, hexamethylphosphorictriamide, dimethylformamide, tetrahydrothiophene dioxide, dimethylacetamide, N-methylpyrrolidone etc. are solvents which can be used in the base catalyzed reaction.

The aromatic amino carbonyl monomers suitable for processes of the present invention can be prepared in a variety of ways but are often prepared by combinations of organic reactions, including acylations, oxidations, and reductions. The synthesis of 4,6-diaminoisophthalaldehyde is described in P. Ruggli and P. Hindemann, *Helv. Chim. Acta.*, 20, 272 (1937), of 2,5-diaminoterephthalaldehyde in P. Ruggli and F. Brandt, *Helv. Chim. Acta*, 27, 274 (1944), of 4,6-dibenzoyl-m-phenylenediamine in L., Chardonnes and R. Ritter, *Helv. Chim. Acta*. 38, 393 (1955), of 2,5-dibenzoyl-p-phenylenediamine in D. A. Kinsey and S. G. P. Plant, *J. Chem. Soc.*, 1 (1958), and of 2,2'-diaminoisophthalophenone in J. C. E. Simpson, C. M. Atkinson, C. Schofield and O. Stephenson, *J. Chem. Soc.*, 646 (1945).

The methylene ketones suitable for processes of the present invention can be prepared in a variety of ways but are often conveniently prepared by Friedel-Crafts reactions of acid chlorides on aromatic nuclei. The synthesis of 1,4-diphenylacylbenzene is described in C. L. Schilling, Jr., J. A. Reed and J. K. Stille, *Macromolecules*, 2, 85 (1969), of 1,4-diphenacetylbenzene in M. A. Ogliaruso and E. I. Becker, *J. Org. Chem.*, 30, 3554 (1965), of 4,4'-diphenacetylphenyl ether, 4,4'-diphenylacetylphenyl sulfide and 4,4'-diphenacetylbiphenyl in H. A. Ogliaruso, L. A. Shadov, and E. I. Becker, *J. Org. Chem.*, 28, 2725 (1963), of p-diacetylbenzene in L. Berend and P. Herms, *J. Prakt. Chem.*, 74, 134 (1906) of 1,3-diacetylbenzene in J. Bowman, J. Chem. Soc., 323 (1950), of 4,4'-diacetylphenyl ether in H. Kipper, *Chem. Ber.*, 38, 2491 (1905), of 2,6-diacetylpyridine in A. P. Terent'ev, E. G. Rukhadze, I. G. Mochalina, and V. V. Rode, *Zh. Vses. Khim. Obshch. im. D. I. Mendeleeva*, 6, 116 (1961), of 4,4'-diacetyldiphenylsulfide in C. M. Smith, U.S. Pat. No. 2,903,461 (1959), of 4,4'-diacetyldiphenylsulfone in P. F. Hu, *J. Chem. Soc.*, 178 (1959), of 4,4'-diacetylbiphenyl in H. Tani, F. Toda and K. Matsumiya, *Bull. Chem. Soc. Jap.*, 36, 391 (1963), of dibenzo[a,e]-cyclooctene-5,11(6H,12H)dione in P. Yates, E. G. Lewars and P. H. McCabe, *Can. J. Chem.*, 48, 788 (1970), and of 1,10-diketo[2.2]metacyclophane in T. Hylton and V. Boekelheide, *J. Amer. Chem. Soc.*, 90, 6887 (1968).

The complete disclosures of the above articles relating to the methods for preparation of the amino carbonyl compounds and the methylene ketones are incorporated herein by reference, and also represent the types of syntheses employed for the preparation of such compounds.

In carrying out the methods of the present invention, a mixture of the amino ketone and the methylene ketone is selected such that both the R groups in the amino carbonyl compound and the methylene ketone are not hydrogen. Either the R group in the amino carbonyl compound or the R group in the methylene ketone must be aryl, with the other being hydrogen, or both the R group in the amino-carbonyl and the methylene ketone must be aryl. The advantage of including the aryl groups is that the resulting polymer is more soluble in common organic solvents, and thereby fabrication of the polymer into films, fibers, coatings, laminates and adhesive preparations is facilitated. The polymerization of 4,6-diaminoisophthalaldehyde with p-diacetylbenzene, 2,6-diacetylpyridine, or 4,4-diacetylphenyl ether in hexamethyl phosphoramide with a potassium hydroxide catalyst gives polyanthrazolines as described in W. Bracke, *Macromolecules*, 2, 286 (1969), which are insoluble in common organic solvents.

The mixture of the amino ketone and the methylene ketone, usually in equimolar or nearly equimolar ratios is heated in the presence of an acid or base catalyst in a suitable solvent, but not necessarily in the absence of oxygen.

The reaction conditions for the different types of amino carbonyls and methlene ketones, particularly with respect to solvent, catalyst, time and temperature can be illustrated with the model reactions which afford the anthrazoline and quinoline compounds. Table I shows the results of the reaction of o-aminobenzophenone and o-aminobenzaldehyde with acetyl benzene and deoxybenzoin.

It is evident from the table that the base catalyzed reaction is unsuitable for the reaction of o-aminobenzaldehyde with desoxybenzoin, and therefore these reaction conditions are not those which are best for the polymerization.

The reaction between o-aminobenzophenone and deoxybenzoin (Trials 1-3) proceeded to pure (> 95%) 2,3,4-triphenylquinoline when an acid catalyst was used. However, with a basic catalyst, the isolated product contained 20% of the starting aminoketone (Trial 4).

Under the same conditions, reaction between o-aminobenzophenone and acetophenone did not give as high yields of quinoline derivatives. With longer reaction times and higher temperatures 2,4-diphenylquinoline was isolated. (Compare trials 6 and 7). Again a base catalyst (DBN) did not appear to be as advantageous for these reactions (Trial 8).

The acid catalyzed reaction of o-aminoacetophenone with dibenzo[a,e]cyclooctene-5,11(6H,12H)-dione affords high yields of product only at long reaction times and at higher temperatures (Table II).

When polyphosphoric acid was used as the solvent, without other added acid, the reaction of o-aminobenzophenone with 4,4'-diphenacetylbiphenyl at 140° C for 20 hours gave a quantitative yield of product.

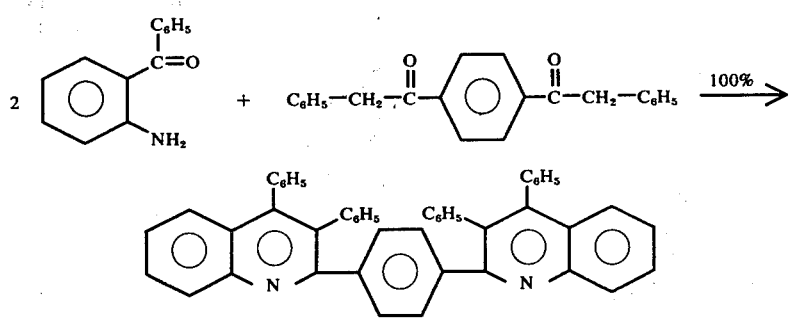

From the forgoing it is also evident that the upper limit of temperature at which the reaction is run at 1 atmosphere depends on the boiling point of the reaction solvent ($CH_3CO_2H$; 118° C, chlorobenzene, 132° C; DMSO, 189° C) or the temperature at which it decomposes. If the reaction is run above the boiling point of any solvent, it must be run in a sealed pressure reaction apparatus or other suitable reaction vessel. Reaction

TABLE 1

Friedlander Reactions of Acyclic Ketones with o-Aminobenzaldehyde and o-Aminobenzophenone

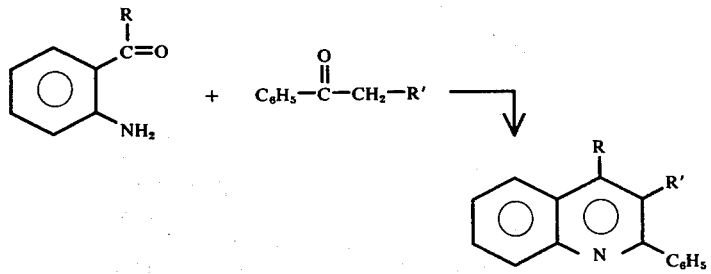

| Trial | R | R' | Catalyst[a] | Solvent[b] | Temperature (°C) | Time (hr) | Yield[c] |
|---|---|---|---|---|---|---|---|
| 1 | $C_6H_5$ | $C_6H_5$ | $H_2SO_4$ | $CH_3COOH$ | 118 | 4.0 | 98+ |
| 2 | $C_6H_5$ | $C_6H_5$ | HCl | $C_6H_5Cl$ | 132 | 4.5 | 98+ |
| 3 | $C_6H_5$ | $C_6H_5$ | HCl | $C_6H_5Cl$ | 120 | 4.0 | ~95 |
| 4 | $C_6H_5$ | $C_6H_5$ | KOH | DMSO | ~110 | 8.0 | 80 |
| 5 | $C_6H_5$ | H | $H_2SO_4$ | $CH_3CO_2H$ | 118 | 20.5 | >90 |
| 6 | $C_6H_5$ | H | HCl | $C_6H_5Cl$ | 120 | 4.0 | ~70 |
| 7 | $C_6H_5$ | H | HCl | $C_6H_5Cl$ | 132 | 13.5 | >95 |
| 8 | $C_6H_5$ | H | DBN | HMPA | 95 | 4.0 | ~75 |
| 9 | H | $C_6H_5$ | KOH | HMPA | 95 | 6.0 | 0 |

TABLE I-continued
Friedlander Reactions of Acyclic Ketones with o-Aminobenzaldehyde and o-Aminobenzophenone

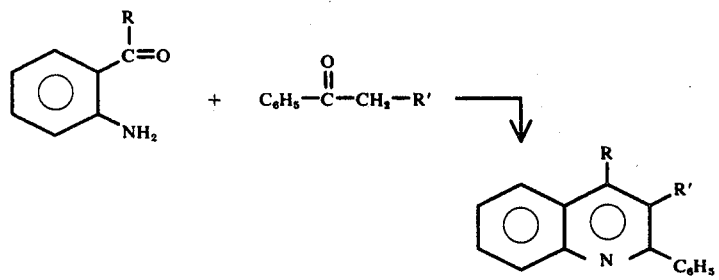

| Trial | R | R' | Catalyst[a] | Solvent[b] | Temperature (° C) | Time (hr) | Yield[c] |
|---|---|---|---|---|---|---|---|
| 10 | H | C₆H₅ | DBN | HMPA | 95 | 5.0 | 0 |
| 11 | H | C₆H₅ | KOH | DMSO | 80 | 4.0 | ~80 |
| 12 | H | C₆H₅ | H₂SO₄ | CH₃COOH | 118 | 5.0 | ~80 |

[a]DBN = 1,5-Diazabicyclo[4.3.0]non-5-ene
[b]HMPA = Hexamethylphosphoramide; DMSO = dimethylsulfoxide
[c]Yields determined by infrared measurements

TABLE II
Friedländer Reactions of Dibenzo[a,e]cyclooctene-5,11(6H,12H)-dione with o-Aminobenzophenone

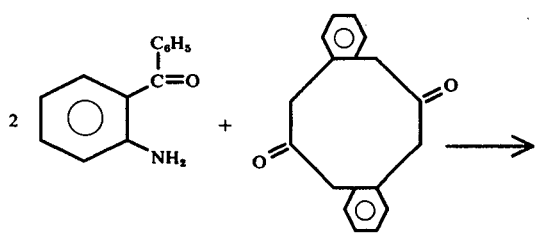

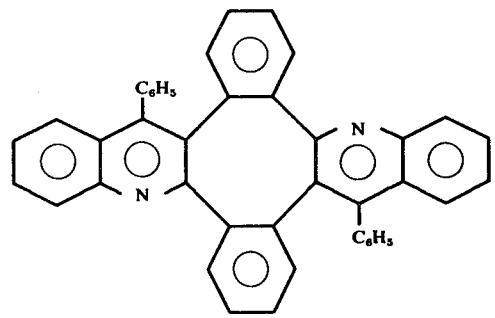

| Catalyst | Solvent | Temperature (° C) | Time (hr) | Yield[a] |
|---|---|---|---|---|
| H₂SO₄ | CH₃COOH | 118 | 4.0 | 80% |
| H₂SO₄ | CH₃COOH | 118 | 24.0 | 92% |
| H₂SO₄ | CH₃COOH | 118 | 96.0 | 95% |
| HCl | C₆H₅Cl | 132 | 5.0 | 90% |

[a]Yields determined by infrared measurements times are generally greater than 4 hours, and temperatures are generally in the 100°–200° range, depending on the speed of the reaction which is effected by the type of catalyst and the type of reactant.

The forgoing results with regard to reaction temperature, catalysts, solvents, and times can be applied to obtain the optimum conditions for the polymerization reactions between the amino carbonyl and methylene ketone monomers.

As examples of the polymers of the present invention, the reaction of 4,6-dibenzoyl-m-phenylenediamine with p-diacetylbenzene affords a polymer containing the anthrazoline recurring unit:

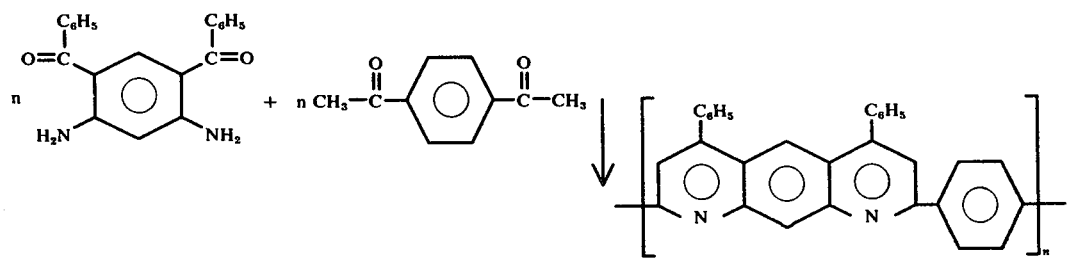

As a further illustrative example of the polymers of the present invention, the reaction of 4,6-diaminoisophthalaldehyde with dibenzo[a,e]cyclooctene-5,11(6H,12H)-dione affords a polymer containing a ladder anthrazoline recurring unit:

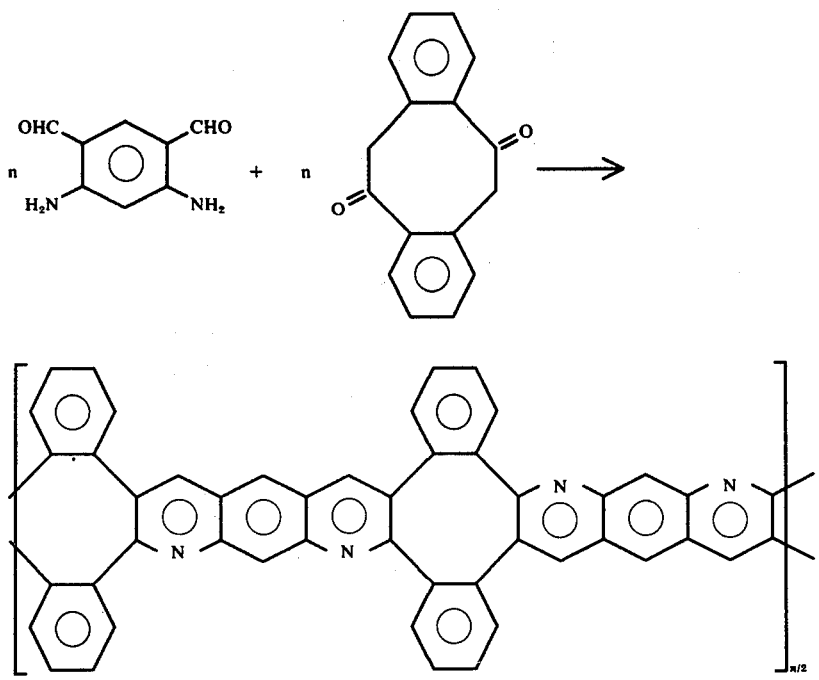

As a further illustrative example of the polymers of the present invention, the reaction of 2,2'-diaminoisophthalophenone with 1,4-diphenacylbenzene affords a polymer containing the quinoline recurring unit:

rate of 5° C per minute. Moreover, even in an air atmosphere, the polymers are stable up to near 500° C.

The solubility of the polymers of the present invention varies with the degree of polymerization or molecular weight as well as with the particular monomers

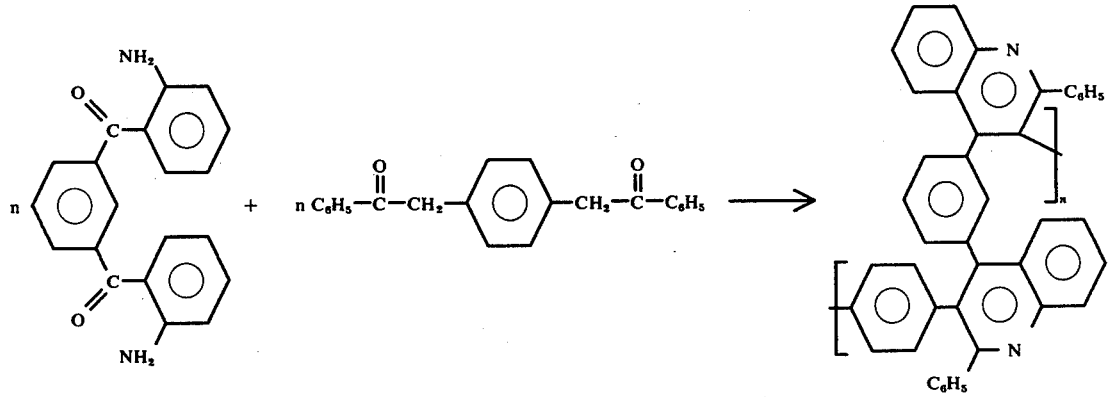

Wherein $n$ in all cases represents an integer such that the products will have a sufficiently high molecular weight to afford an inherent viscosity of at least about 0.1 in a suitable solvent. Generally, the inherent viscosity may range up to about 3.0 in a suitable solvent. Since the products are more conveniently characterized by reduced viscosity methods, they are preferred for indicating the degree of polymerization of the product.

These polymers are desirable for their inherent properties and are applicable to a wide variety of ultimate uses because of their high melting points and high thermal stability. To illustrate, these polymers are generally stable to 500° C in an inert atmosphere and lose only 10 to 20% of their weight even up to 800° C when subjected to a thermal gravimetric analysis with a heating chosen and can range from being completely soluble to partially soluble in such solvents as phenols, sulfuric acid, acetic acid, polyphosphoric acid, formic acid, chlorobenzene, hexamethylphosphoramide, dimethylsulfoxide etc. Greater solubility in the polymers is achieved if the amino carbonyl and methylene ketone monomers are selected such that in each recurring anthrazoline ring, in addition to the aromatic rings responsible for catenation, pendant diaromatic substitution, preferably pendant phenyl groups, in the 2,8-, 3,7- or 4,6- positions, or pendant tetraaromatic substitution, preferably pendant phenyl groups in the 3,4,6,7- or 2,4,6,8-positions are present:

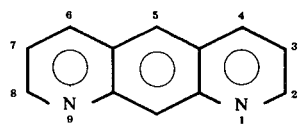

In cases in which the isoanthrazoline ring is formed as a recurring unit, then the monomers are selected such that in addition to the aromatic rings responsible for catenation there is pendant diaromatic substitution, preferably pendant phenyl groups, in the 3,8-, 4.9- or 2,7-positions, or pendant tetraaromatic substitution, preferably pendant phenyl groups in the 3,4,8,9- or 2,4,7,9-positions:

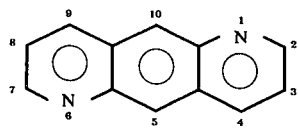

In cases in which the quinoline ring is formed as a recurring unit, then the monomers are selected such that in addition to the aromatic rings responsible for catenation there is pendant aromatic substitution, preferably pendant phenyl groups, in the 2-, 3- or 4-positions, or pendant diaromatic substitution, preferably pendant phenyl groups in the 2,4- or 3,4-positions:

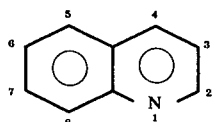

With this substitution in each anthrazoline or quinoline recurring unit, the solubility in various solvents is greater than for those polymers which, in addition to the aromatic rings responsible for catenation, do not have pendant aromatic groups substituted in those positions, but instead have hydrogen.

Polymers of this invention may be represented by the following structural formulae:

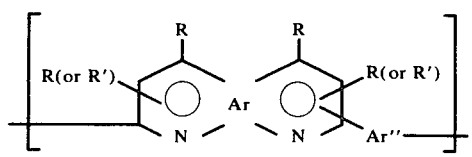

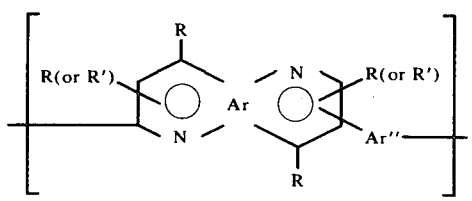

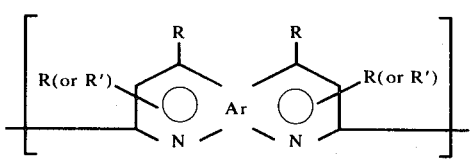

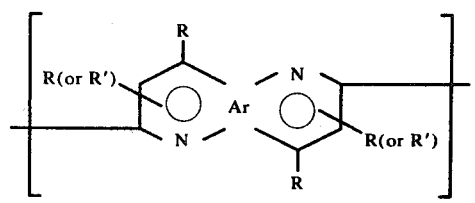

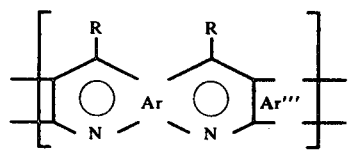

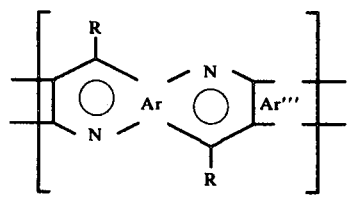

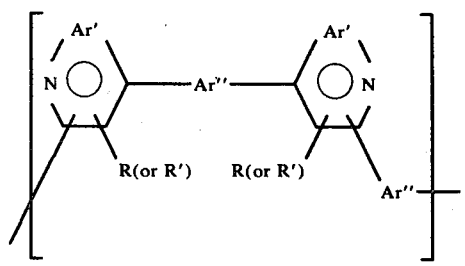

and

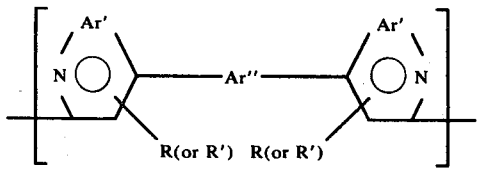

wherein all substituents have the meaning set forth above.

The following examples are illustrative of the present invention but are not considered limiting thereof in any way.

EXAMPLE 1

Polymerization of 4,6-Dibenzoyl-*m*-phenylenediamine and 1,4-Diphenacetylbenzene in Polyphosphoric Acid Polyphosphoric acid solvent was freshly prepared by adding 8.74g of phosphorus pentoxide to 6.39 g of 85.6% phosphoric acid with stirring at 0° C under a nitrogen atmosphere. After the addition was complete, the resulting 84% polyphosphoric acid (PPA) was heated for 3 hrs. at 80° C. To the completely homogeneous and colorless PPA was added 0.3145 (1.00 mmol) of 1,4-diphenacetylbenzene and 0.3166g (1.00 mmol) of 4,6-dibenzoyl-m-phenylenediamine. The mixture was then heated under a nitrogen atmosphere as follows: 80°–110°, 2 hr; 110°, 1 hr; 125°, 5 hr; 125°–140°, 1 hr; 140°, 10 hr. The reaction mixture was yellow after addition, changing to orange and finally a clear red solution at 140° C.

The reaction mixture was then cooled to 40°, added to 200 ml of methanol and stirred for 1 hr. This was then added to 200 ml of water and the polymer precipitate was centrifuged and filtered. The polymer was purified by adding it to methanol and heating to the reflux temperature, after adding an equal volume of water. The brown polymer was dried under reduced pressure. The IR analysis (polymer powder) showed no appreciable carbonyl absorption at 5.95 $\mu$. The polymer was soluble in $m$-cresol and sulfuric acid, and had an inherent viscosity ($H_2SO_4$, 0.24 g/dl, 25° C) of 0.3. The thermal gravimetric analysis in air showed a break at 475° C (13% weight loss in nitrogen at 800° C). Anal. Calc'd for $C_{42}H_{26}N_2$: %C, 90.30; %H, 4.69; %N, 5.01. Found: %C, 86,58 ; %H, 4.95 ; %N 4.96.

EXAMPLE 2

Polymerization of 4,6-Dibenzoyl-$m$-phenylenediamine and 4,4'-Diacetylbiphenyl in Polyphosphoric Acid To an 84% polyphosphoric acid solvent prepared from 7.1 g of 85.6% phosphoric acid and 9.7 g of phosphorus pentoxide as described in Example 1 above was added 0.3007 g (1.262 mmol) of 4,4'-diacetylbiphenyl and 0.3993 g (1.262 mmol) of 4,6-dibenzoyl-$m$-phenylenediamine to give a 4% solution of monomers. The reaction mixture was slowly heated under a stream of nitrogen to 110° over a period of 6 hrs, maintained at 105°–110° for 3 hrs, and then heated at 135°–140° for 11 hrs.

At this time the entire reaction mixture became a rubbery ball on the stirring blade. The brown reaction mixture was transferred into a one 1 flask with 350 ml of methanol and heated to the reflux temperature for 12 hrs. The brick red polymer was filtered and slurried with freshly distilled concentrated ammonium hydroxide. The recovered brownish orange polymer (0.52 g, 85%) had an inherent viscosity ($CH_3SO_3H$, 0.16 g/dl, 25° C) of 1.35. Thermal gravimetric analysis showed a break in air at 510° C and in nitrogen the polymer had lost 20% of its weight at 800° C. Anal. Calc'd for $C_{36}H_{22}N_2$: %C, 89.60; %H, 4.60; %N, 5.80. Found: %C, 86.77; %H, 4.65; %N 5.69.

EXAMPLE 3 polymerization of 4,6-Dibenzoyl-$m$ phenylenediamine and 4,4'-Diacetylbiphenyl in $m$-Cresol A solution of 0.4068 g (1.286 mmol) of 4,6-dibenzoyl-$m$-phenylenediamine and 0.3064 g (1.286 mmol) of 4,4'-diacetylbiphenyl in 17.5 ml of $m$-cresol was stirred with 10 drops of concentrated sulfuric acid at 70° C. The solution was heated for 18 hrs at 125° C and for 22 hrs at 145° under a nitrogen atmosphere. After cooling the $m$-cresol solution to room temperature, it was saturated with anhydrous hydrogen chloride for 10 min and then reheated from 135° to 180° C over a period of 5 hrs. The resulting polymer was precipitated into 300 ml of methanol, filtered, and washed several times with freshly distilled ammonium hydroxide to afford a red powder.

An IR analysis of the polymer showed no appreciable carbonyl absorption. In addition, the polymer had an inherent viscosity ($H_2SO_4$, 0.5 g/dl, 25° C) of 0.3; the thermal gravimetric analysis in air showed a break at 490° C.

EXAMPLE 4

Polymerization of 1,4-Diphenacylbenzene with 4,6-Dibenzoyl-$m$-phenylenediamine in Polyphosphoric Acid A suspension of 0.3354 g (1.067 mmol) of 4,6-dibenzoyl-$m$-phenylenediamine and 0.3375 g (1.067 mmol) of 1,4-diphenacylbenzene in 17 g of polyphosphoric acid (prepared as described in Example 1) was stirred under a nitrogen atmosphere at 60° C. This suspension was stirred and heated as follows: 60°–100° C, 2 hr; 100° C, 14 hr; 100°–145°, 3 hr; 145°, 21 hr. At this time, the reaction mixture had become so viscous it would no longer stir efficiently. The reaction mixture was precipitated into 300 ml of methanol, filtered, and washed with water and freshly distilled ammonium hydroxide.

The resulting polymer had a inherent viscosity ($CH_3SO_3H$, 0.04 gm/dl, 25° C) of 1.0; the thermal gravimetric analysis in air showed a break at 480° C.

EXAMPLE 5

Polymerization of Dibenzo[a,e]cyclooctene-5,11(6H,12H)-dione with 4,6-dibenzoyl-$m$-phenylenediamine in Polyphosphoric Acid To a polyphosphoric acid solvent prepared from 6.4 g of 85.6% phosphoric acid and 8.8 g of phosphorus pentoxide as described in Example 1 was added 0.3987 g (1.260 mmol) of 4,6-dibenzoyl-$m$-phenylenediamine and 0.2977g (1.260mmol) of dibenzo[a,e]cyclooctene-5,11(6H,12H)-dione at 40° C to afford a 4% solution. The resulting suspension was stirred and heated as follows: 40°–100°, 2.0 hr; 100°, 18 hr; 100°–150°, 5 hr; 150°, 19 hr; 150°–180°, 1 hr; 180°, 6 hr. The viscous black polymer solution was cooled to room temperature and precipitated with 150 ml of methanol. The black solids were washed again with methanol, once with water, and finally twice with freshly distilled ammonium hydroxide to yield 551 mg (91%) of polymer. The ladder polymer had an inherent viscosity ($H_2SO_4$, 0.25 g/dl, 25° C) of 0.08; thermal gravimetric analysis in air showed a break at 490° C (28% weight loss in nitrogen at 800° C).

EXAMPLE 6

Polymerization of 4,6-Diaminoisophthalaldehyde with 1,4-Diphenacetylbenzene in Hexamethylphosphoramide.

A solution of 0.4104 g (2.5 mmol) of 4,6-diaminoisophthalaldehyde in 10 ml of hexamethylphosphoramide was mixed with 0.7859 g (2.5 mmol) of 1,4-diphenacetylbenzene, and 5 drops of 10% methanolic potassium hydroxide solution was added. The mixture was gradually heated from room temperature to 120° over 4 hr and kept at this temperature for 2 hr. After completion of the polymerization, the mixture was cooled and then diluted with 200 ml of water. The polymer was filtered, washed, and dried to afford a quantitative yield. Thermal gravimetric analysis of the polymer in air showed a break at 525° C (18% weight loss in nitrogen at 800° C); the inherent viscosity (HMPA, 0.25 g/dl, 25° C) was found to be 0.2. Anal. Calc'd for $C_{30}H_{18}N_2$: %C, 88.65, %H, 4.46; %N, 6.89. Found: %C, 86.23; %H, 4.54; %N, 6.92.

EXAMPLE 7

Polymerization of 4,6-Diaminoisophthalaldehyde with Bis(4-phenacetylphenyl) ether in Hexamethylphosphoramide The reaction of 0.4104 g (2.5 mmol) of 4,6-diaminoisophthalaldehyde with 1.6161 g (2.5 mmol) of bis(4-phenacetylphenyl) ether, as described in Example 6, afforded a quantitative yield of polymer. This polymer had an inherent viscosity (HMPA, 0.25 g/dl, 25° C) of 0.2; thermal gravimetric analysis in air showed a break at 515° C (37% weight loss in nitrogen at 800° C). In addition the polymer was soluble in chloroform, dimethylsulfoxide, m-cresol and sulfuric acid.

What is claimed is:

1. A method for the preparation of polymers containing anthrazoline, isoanthrazoline or quinoline recurring units from the reaction of a compound selected from the group consisting of (a) an aromatic amino carbonyl containing two sets of ortho-amino carbonyl functions attached to an aromatic nucleus selected from the group consisting of structure represented by the formulas:

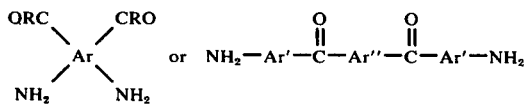

wherein R is hydrogen or aryl, and the Ar, Ar', and Ar'' are aryl groups, with (b) a methylene ketone compound selected from the group consisting of the structures represented by the formulas:

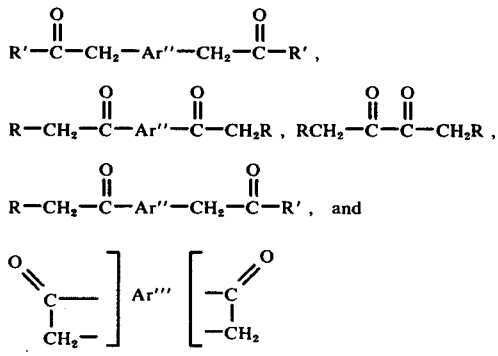

wherein R is hydrogen or aryl, R' is aryl, and the Ar's are aryl groups except that the amino carbonyl and the methylene ketone are selected such that neither or at least only one of them contain R equal to hydrogen in the preparation of any given polymer.

2. A method as defined in claim 1 wherein the aromatic nucleus, Ar, of the aminocarbonyl monomer is monocyclic.

3. A method as defined in claim 1 wherein the aromatic nucleus, Ar, of the aminocarbonyl monomer is polycyclic.

4. A method as defined in claim 1 wherein the aromatic nucleus, Ar'', of the aminocarbonyl monomer is monocyclic.

5. A method as defined in claim 1 wherein the aromatic nucleus, Ar'', of the aminocarbonyl monomer is polycyclic.

6. A method as defined in claim 1 wherein the aromatic nucleus, Ar', of the aminocarbonyl monomer is monocyclic.

7. A method as defined in claim 1 wherein the aromatic nucleus, Ar', of the aminocarbonyl monomer is polycyclic.

8. A method as defined in claim 1 wherein the aromatic amino carbonyl is in the form of a dihydrochloride salt.

9. A method as defined in claim 1 wherein the aromatic nucleus, Ar'', of the methylenecarbonyl is monocyclic.

10. A method as defined in claim 1 wherein the aromatic nucleus, Ar'', of the methylene carbonyl is polycyclic.

11. A method as defined in claim 1 wherein the aromatic nucleus, Ar''', of the methylene carbonyl is structured such that the two methylene carbonyl functions are joined by two bridging aromatic nuclei which are each monocyclic.

12. A method as defined in claim 1 wherein the aromatic nucleus, Ar''', of the methylene carbonyl is structured such that the two methylene carbonyl functions are joined by a polycyclic bridging aromatic nucleus.

13. A method as defined in claim 1 wherein the amino carbonyl is 4,6-diaminoisophthalaldehyde.

14. A method as defined in claim 1 wherein the amino carbonyl is 2,5-diaminoterephthalaldehyde.

15. A method as defined in claim 1 wherein the amino carbonyl is 4,6-dibenzoyl-m-phenylenediamine.

16. A method as defined in claim 1 wherein the amino carbonyl is 2,5-dibenzoyl-p-phenylenediamine.

17. A method as defined in claim 1 wherein the amino carbonyl is 2,2'-diaminoisophthalophenone.

18. A method as defined in claim 1 wherein the amino carbonyl is 2,2'-diaminoterephthalophenone.

19. A method as defined in claim 1 wherein the amino carbonyl is 4,4'-(o-aminobenzoyl)biphenyl.

20. A method as defined in claim 1 wherein the amino carbonyl is 4,4'-(o-aminobenzoyl)diphenyl ether.

21. A method as defined in claim 1 wherein the amino carbonyl is 3,3'-dibenzoylbenzidine.

22. A method as defined in claim 1 wherein the amino carbonyl is 3,3'-dibenzoyl-4,4'-diaminodiphenyl ether.

23. A method as defined in claim 1 wherein the methylene ketone is biacetyl.

24. A method as defined in claim 1 wherein the methylene ketone is 1,4-diphenacylbenzene.

25. A method as defined in claim 1 wherein the methylene ketone is 1,4-diphenacetylbenzene.

26. A method as defined in claim 1 wherein the methylene ketone is 4,4'-diphenacetylphenyl ether.

27. A method as defined in claim 1 wherein the methylene ketone is 4,4'-diphenacetylphenyl sulfide.

28. A method as defined in claim 1 wherein the methylene ketone is 4,4'-diphenacetylbiphenyl.

29. A method as defined in claim 1 wherein the methylene ketone is p-diacetylbenzene.

30. A method as defined in claim 1 wherein the methylene ketone is 1,3-diacetylbenzene.

31. A method as defined in claim 1 wherein the methylene ketone is 4,4'-diacetylphenyl ether.

32. A method as defined in claim 1 wherein the methylene ketone is 4,4'-diacetyldiphenylsulfide.

33. A method as defined in claim 1 wherein the methylene ketone is 4,4'-diacetyldiphenylsulfone.

34. A method as defined in claim 1 wherein the methylene ketone is 4,4'-diacetylbiphenyl.

35. A method as defined in claim 1 wherein the methylene ketone is 2,6-diacetylpyridine.

36. A method as defined in claim 1 wherein the methylene ketone is dibenzo[a,e]cyclooctene-5,11[6H,12H]dione.

37. A method as defined in claim 1 wherein the methylene ketone is 1,10-diketo[2.2]metacyclophane.

38. A method as described in claim 1 wherein the reaction is carried out in a solvent which will not react with the monomers.

39. A method as described in claim 38 wherein the solvent is selected from the group consisting of benzene, chlorobenzene, o-dichlorobenzene, m-dichlorobenzene, p-dichlorobenzene, mixtures of dichlorobenzenes, 1-chloronaphthalene, 2-chloronaphthalene, tetralin, diphenyl ether, p-dioxane, tetrahydropyran, acetic acid, formic acid, trifluoroacetic acid, phenol, m-cresol, phosphoric acid, polyphosphoric acid, and methane sulfonic acid.

40. A method as described in claim 1 wherein the reaction is carried out in the presence of a base catalyst which is a hydroxylic base, an alkoxide or a Lewis base.

41. A method as described in claim 40 wherein the hydroxylic base catalysts are selected from the group consisting of hydroxides, lithium hydroxide, sodium hydroxide, potassium hydroxide, calcium hydroxide, alkali metal hydroxides.

42. A method as described in claim 40 wherein the reaction is carried out in a solvent which will not react with the monomers or the catalyst such that it will have an adverse effect on the polymerization reaction.

43. A method as described in claim 42 wherein the solvent is selected from the group consisting of benzene, tetralin, diphenyl ether, p-dioxane, tetrahydropyran, dimethylsulfoxide, hexamethylphosphoric triamide, dimethylformamide, tetrahydrothiophene dioxide dimethylacetamide, and N-methylpyrrolidone.

44. A method as described in claim 1 wherein the reaction is carried out by heating the reaction mixture between 25° C and 200° C.

45. A method as described in claim 38 wherein the reaction is carried out at the reflux temperature of the solvent.

46. A method as described in claim 42 wherein the reaction is carried out at the reflux temperature of the solvent.

47. The method as defined in claim 40, wherein said alkoxides are selected from the group consisting of sodium methoxide, sodium ethoxide, potassium methoxide, potassium ethoxide, sodium t-butoxide, and potassium t-butoxide.

48. A composition comprising a polymer having recurring units of the general formula

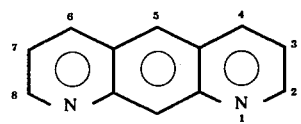

wherein the integers 1–8 define C atom positions in said unit, wherein said unit contains diaromatic substitution in the 2,8-, 3,7-, or 4,6- position or tetraaromatic substitution in the 3,4,6,7- or 2,4,6,8- positions wherein the recurring units link at the 2,8 or 3,7 position.

49. A polymer having recurring units of the general formula

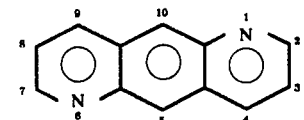

wherein integers 1–10 define C atom positions of said unit, wherein said unit contains diaromatic substitution in the 3,8-, 4,9-, or 2,7- or tetraaromatic substitution in the 3,4,8,9- or 2,4,7,9-positions, wherein the recurring units link at the 2,7 or 3,8 positions.

50. A polymer having recurring units of the general formula:

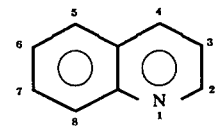

wherein the integers 1–8 define C-atom positions of said, unit, wherein said unit contains aromatic substitution at 2-, 3-, 4-, positions or diaromatic substitution in the 2,4- or 3,4- position, said recurring units being linked at positions not occupied by aromatic substitution.

51. A polymer composition containing a polymer containing recurring anthrazoline units, comprising the reaction product of a compound of the general formula

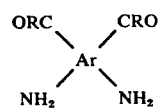

wherein R is hydrogen or aryl, wherein Ar is an aromatic nucleus with a single aromatic ring, with a methylene ketone, said methylene ketone containing two ketone functions, having a methylene group adjacent to each ketone, said anthrazoline unit being of the general formula

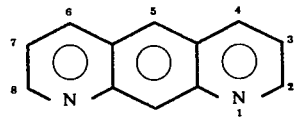

wherein said anthrazoline unit contains pendant diaromatic substitution in the 2,8-, 3,7-, or 4,6-positions, or pendant tetraaromatic substitution in the 3,4,6,7- or 2,4,6,8-positions.

52. A polymer composition containing a polymer having recurring isoanthrazoline units, comprising the reaction product of (1) a compound of the general formula:

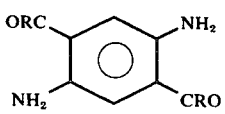

wherein R is hydrogen or aryl, with (2) a methylene ketone, said methylene ketone containing two ketone functions having a methylene group adjacent to each ketone function, said isoanthrazoline unit being of the general formula:

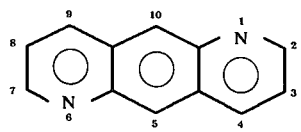

wherein said isoanthrazoline unit contains pendant diaromatic substitution in the 3,8-, 4,9-, or 2,7- positions, or pendant tetraaromatic substitution in the 3,4,8,9- or 2,4,7,9-positions.

53. A polymer composition containing a polymer having recurring quinoline units, comprising the reaction product of (1) a compound of the general formula:

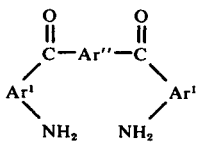

wherein Ar' and Ar'' are aryl groups, with (2) a methylene ketone, said methylene ketone containing two ketone functions having a methylene group adjacent to each ketone, said quinoline unit having the general formula:

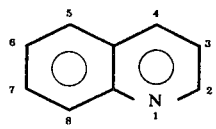

said quinoline unit containing pendant aromatic substitution in the 2-, 3-, or 4- positions, or pendant diaromatic substitution in the 2,4- or 3,4- positions.

54. A method for the preparation of polymers containing anthrazoline, isoanthrazoline or quinoline recurring units comprising reacting a compound selected from the group consising of
a. an aromatic amino carbonyl containing two sets of ortho-amino carbonyl functions attached to an aromatic nucleus selected from the group consisting of structure represented by the formulas:

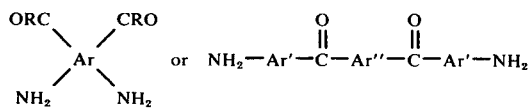

wherein R is hydrogen or aryl, and Ar, Ar' and Ar'' are aryl groups, with b. a methylene ketone compound selected from the group consisting of the structures represented by the formulas:

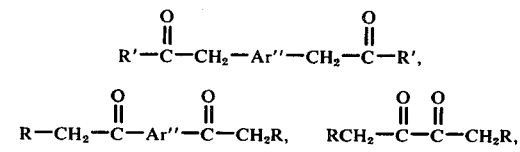

and

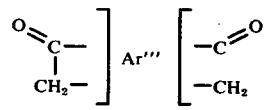

wherein R is hydrogen or aryl, R' is aryl, and the Ar, Ar', and Ar'' are aryl groups except that the amino carbonyl and the methylene ketone are selected such that neither or at least only one of them contain R equal to hydrogen in the preparation of any given polymer, in the presence of an acid or base catalyst to produce said polymers containing anthrazoline, isoanthrazoline or quinoline recurring units.

55. The method of claim 54 wherein compound (a) and compound (b) are mixed with a solvent inert under the reaction condition to said catalyst.

56. The method of claim 54 wherein said compounds (a) and (b) are contacted with said catalyst at temperature of about 25° C. to 250° C.

57. The method of claim 56 wherein said compounds (a) and (b) are mixed with a solvent which is inert under the reaction condition to said catalyst.

58. The method of claim 54 wherein compound (a) and compound (b) are allowed to react in the presence of an acid or base catalyst, at temperatures from about 25° C. to 250° C. in a solvent which is inert under the reaction condition to said catalyst.

59. The method of claim 54 wherein the polymer containing anthrazoline, isoanthrazoline or quinoline recurring units, is separated by precipitation.

60. A method as described in claim 54 wherein said base catalyst is a hydroxylic base, an alkoxide or a Lewis base.

61. A method as described in claim 60 wherein the hydroxylic base catalysts are selected from the group consisting of hydroxides, alkoxides, lithium hydroxide, sodium hydroxide, potassium hydroxide, calcium hydroxide, alkali metal hydroxides.

62. The method as defined in claim 60 wherein said alkoxides are selected from the group consisting of sodium methoxide, sodium ethoxide, potassium methoxide, potassium ethoxide, sodium t-butoxide, and potassium t-butoxide.

63. A method for preparation of polymers containing anthrazoline, isoanthrazoline or quinoline recurring units comprising reacting a, compound selected from the group consisting of (a) an aromatic amino carbonyl containing two sets of orthoamino carbonyl functions attached to an aromatic nucleus selected from the group consisting of structure represented by the formulas:

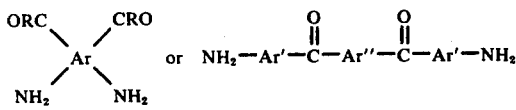

wherein R is hydrogen or aryl, and Ar, Ar' and Ar'' are aryl groups, with (b) a methylene ketone compound selected from the group consisting of the structures represented by the formulas:

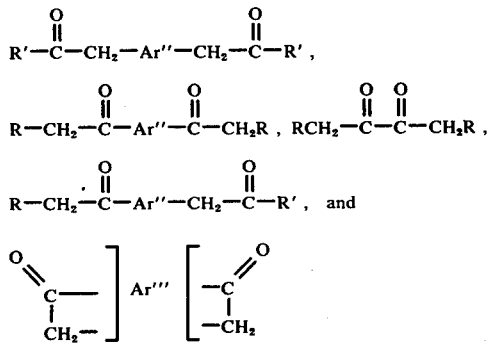

wherein R is hydrogen or aryl, R' is aryl, and Ar, Ar' and Ar'' are aryl groups except that the amino carbonyl and the methylene ketone are selected such that neither or at least only one of them contain R equal to hydrogen in the preparation of any given polymer, and
wherein the reaction is carried out in the presence of acid catalyst which is a protonic acid or a Lewis acid.

64. A method as defined in claim 63 wherein the said protonic acid catalyst is selected from the group consisting of sulfuric acid, hydrochloric acid, hydrofluoric acid, hydrobromic acid, hydroiodic acid, chloric acid, methane sulfonic acid, phosphoric acid, polyphosphoric acid, trifluoroacetic acid, toluene sulfonic acid, and a sulfonated polymer resin.

65. A composition comprising a polymer having recurring units of the general formula

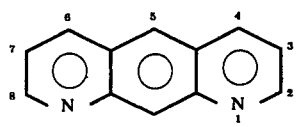

wherein the integers 1–8 define C atom positions in said unit, wherein said unit contains diaromatic substitution in the 2,8-, 3,7-, or 4,6- position or tetraaromatic substitution in the 3,4, 6,7- or 2,4,6,8- positions, wherein the recurring units link at the 2,8 or 3,7 position, and wherein the aromatic groups are phenyl.

66. A polymer having recurring units of the general formula

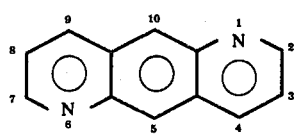

wherein integers 1–10 define C atom positions of said unit, wherein said unit contains diaromatic substitution in the 3,8-, 4,9-, or 2,7- or tetraaromatic substitution in the 3,4,8,9- or 2,4,7,9- positions, wherein the recurring units link at the 2,7 or 3,8 positions, and wherein the aromatic groups are phenyl.

67. A polymer having recurring units of the general formula

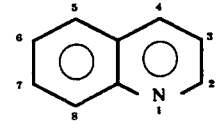

wherein the integers 1–8 define C-atom positions of said unit, wherein said unit contains aromatic substitution of 2-, 3-, 4-, positions or diaromatic substitution in the 2,4- or 3,4- position, and wherein the aromatic groups are phenyl, said recurring units being linked at positions not occupied by aromatic substitution.

68. A cast film comprising a polymer containing anthrazoline, isoanthrazoline or quinoline recurring units prepared from the reaction of a compound selected from the group consisting of (a) an aromatic amino carbonyl containing two sets of ortho-amino carbonyl functions attached to an aromatic nucleus selected from the group consisting of structure represented by the formulas:

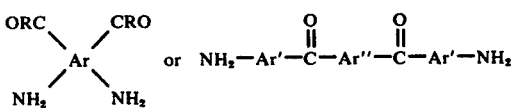

wherein R is hydrogen or aryl, and Ar, Ar' and Ar'' are aryl groups, with (b) a methylene ketone compound selected from the group consisting of the structures represented by the formulas:

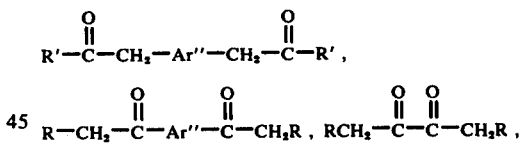

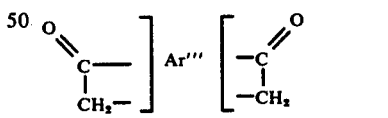

wherein R is hydrogen or aryl, R' is aryl, and Ar, Ar' and Ar'' are aryl groups except that the amino carbonyl and the methylene ketone are selected such that neither or at least only one of them contain R equal to hydrogen in the preparation of any given polymer.

69. A coating on a substrate wherein said coating comprises a polymer containing anthrazoline, isoanthrazoline or quinoline recurring units prepared from the reaction of a compound selected from the group consisting of (a) an aromatic amino carbonyl containing two sets of ortho-amino carbonyl functions attached to an aromatic nucleus selected from the group consisting of structure represented by the formulas:

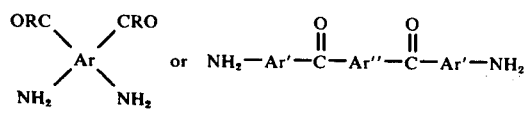 or NH$_2$—Ar'—C(=O)—Ar''—C(=O)—Ar'—NH$_2$ wherein R is hydrogen or aryl, and Ar, Ar' and Ar'' are aryl groups, with (b) a methylene ketone compound selected from the group consisting of the structures represented by the formulas:

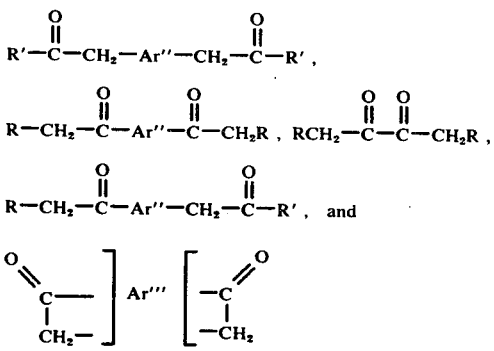

wherein R is hydrogen or aryl, R' is aryl, and Ar, Ar' and Ar'' are aryl groups except that the amino carbonyl and the methylene ketone are selected such that neither or at least only one of them contain R equal to hydrogen in the preparation of any given polymer.

70. A method as defined in claim 63 wherein said Lewis acid is selected from the group consisting of boron trifluoride, phosphorus pentafluoride, sulfur trioxide, aluminum chloride, antimony trifluoride, antimony pentafluoride, antimony trichloride and stannic chloride.

71. A method as described in claim 60 wherein said Lewis base is selected from the group consisting of N-ethyl morpholine, triethylamine, 1,5-diazabicyclo[4.3.0]-non-5-ene and 1,4-diazabicyclo[2.2.2]octane.

72. A method for the preparation of a polymer containing anthrazoline, isoanthrazoline or quinoline recurring units comprising reacting a compound selected from the group consisting of (a) an aromatic amino carbonyl containing two sets of orthoamino carbonyl functions attached to an aromatic nucleus selected from the group consisting of structure represented by the formulas:

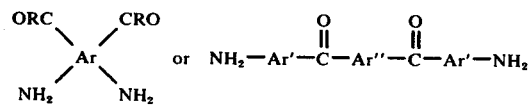

wherein R is hydrogen or aryl, and Ar, Ar' and Ar'' are aryl groups, with (b) a methylene ketone compound selected from the group consisting of the structures represented by the formulas:

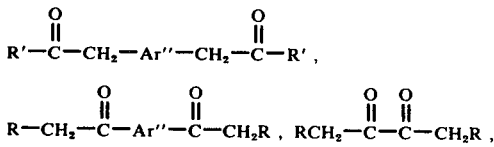

-continued

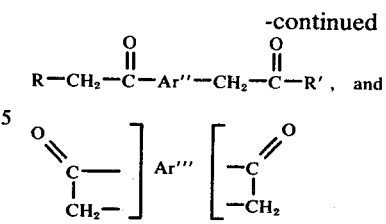

wherein R is hydrogen or aryl, R' is aryl, and Ar, Ar' and Ar'' are aryl groups except that the amino carbonyl and the methylene ketone are selected such that neither or at least only one of them contain R equal to hydrogen in the preparation of any given polymer, wherein compound (a) and compound (b) are allowed to react in the presence of an acid or base catalyst, at temperatures from about 25° C to 250° C.

73. A method for the preparation of a polymer containing anthrazoline, isoanthrazoline or quinoline recurring units comprising reacting a compound selected from the group consisting of (a) an aromatic amino carbonyl containing two sets of orthoamino carbonyl functions attached to an aromatic nucleus selected from the group consisting of structure represented by the formulas:

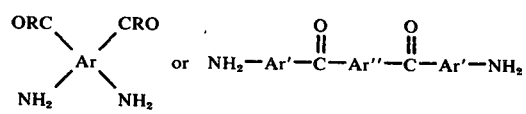

wherein R is hydrogen or aryl, and Ar, Ar' and Ar'' are aryl groups, with (b) a methylene ketone compound selected from the group consisting of the structures represented by the formulas:

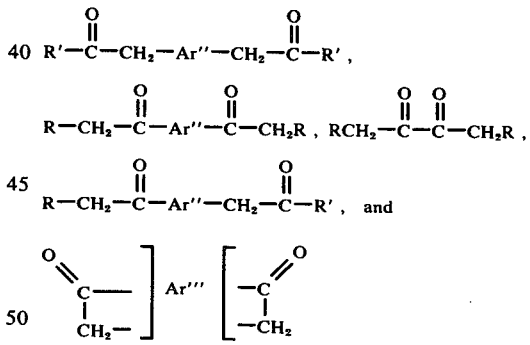

wherein R is hydrogen or aryl, R' is aryl, and Ar, Ar' and Ar'' are aryl groups except that the amino carbonyl and the methylene ketone are selected such that neither or at least only one of them contain R equal to hydrogen in the preparation of any given polymer, in the presence of an acid catalyst to produce said polymers containing anthrazoline, isoanthrazoline or quinoline recurring units, wherein said acid catalyst is a protonic acid or a Lewis acid.

74. A method as described in claim 62 wherein said base is selected from the group consisting of N-ethyl morpholine, triethylamine, 1,5-diazabicyclo[4.3.0]-non-5-ene and 1,4-diazabicyclo[2.2.2]octane.

75. A method as defined in claim 73 wherein the said protonic acid catalyst is selected from the group consisting of protonic acids, sulfuric acid, hydrochloric acid, hydrofluoric acid, hydrobromic acid, hydroiodic acid, chloric acid, methane sulfonic acid, phosphoric acid, polyphosphoric acid, trifluoroacetic acid, toluene sulfonic acid, and a sulfonated polymer resin.

76. A method as defined in claim 73 wherein said Lewis acid is selected from the group consisting of boron trifluoride, phosphorus pentafluoride, sulfur trioxide, aluminum chloride, antimony trifluoride, antimony pentafluoride, antimony trichloride and stannic chloride.

77. A polymer containing a recurring structure represented by a member selected from the following group:

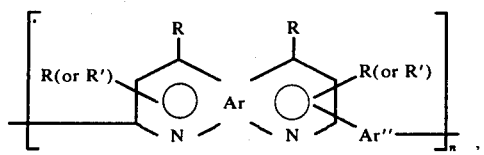

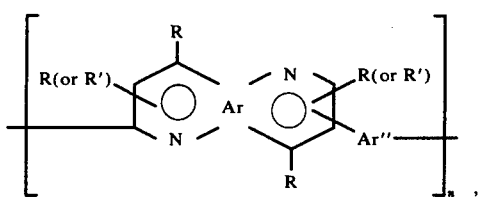

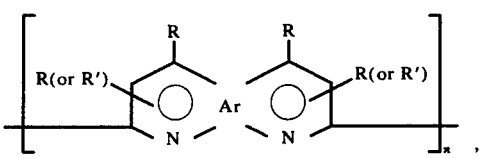

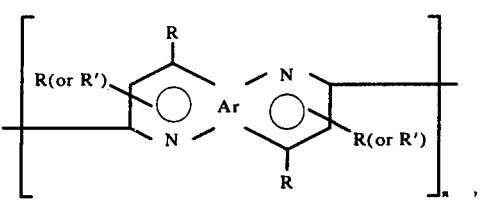

-continued

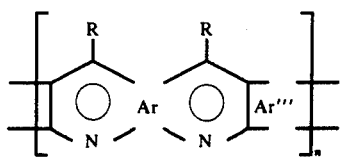

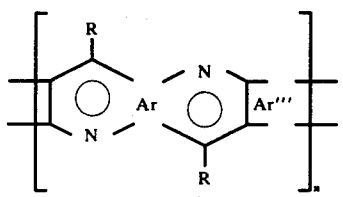

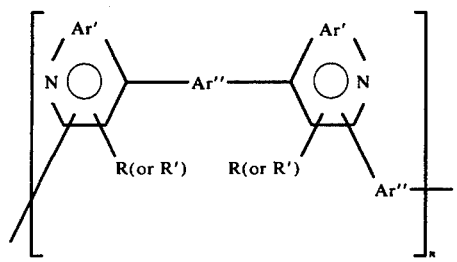

and

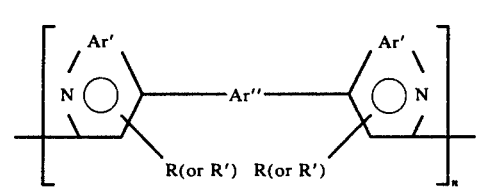

wherein $n$ represents an integer such that the products will have a sufficiently high molecular weight to afford an inherent viscosity of at least about 0.1 in a solvent for said polymer, at 25° C, measured in a solvent selected from the group consisting of $H_2SO_4$, $CH_3SO_3H$ and hexamethylphosphoramide at a concentration of polymer from 0.04 g/dl to 0.5 g/dl, wherein $R$ is hydrogen or aryl, wherein $R'$ is aryl, wherein if R is hydrogen the nitrogen containing ring must contain the substituent $R'$, wherein Ar, Ar', and Ar'' are aryl groups.

* * * * *